United States

McNaney

4,000,939

Jan. 4, 1977

[54] LIGHT OPTIC DATA HANDLING SYSTEMS

[76] Inventor: Joseph T. McNaney, 8548 Boulder Drive, La Mesa, Calif. 92041

[22] Filed: Jan. 12, 1976

[21] Appl. No.: 648,537

[52] U.S. Cl. .......................................... 350/160 R
[51] Int. Cl.² .......................................... G02F 1/16
[58] Field of Search .......................... 350/160, 161

[56] References Cited

UNITED STATES PATENTS

| 3,790,898 | 2/1974 | Gudmundson et al. | 350/161 |
| 3,919,669 | 11/1975 | Hartemann | 350/161 |

Primary Examiner—William L. Sikes

[57] ABSTRACT

The system herein includes light optic means which functions as a light beam distributor in making available, almost instantly, an information bearing beam of light along any one of a plurality of differently positioned output paths stemming from the system as opposed to the conventional or more well known line scan beam deflection systems.

3 Claims, 7 Drawing Figures

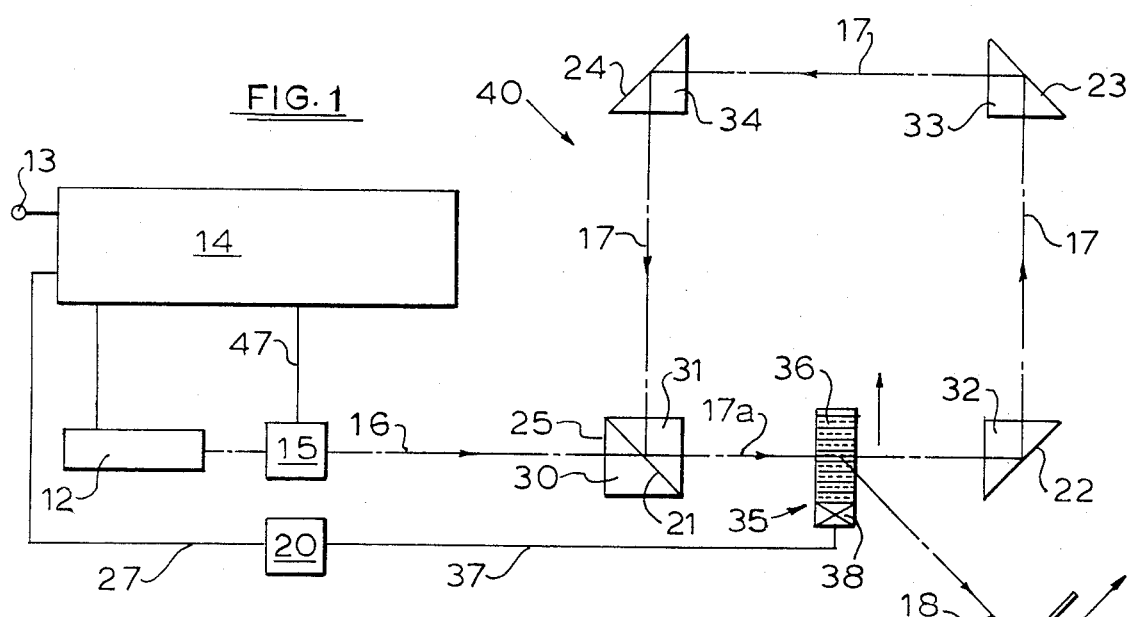
FIG. 1
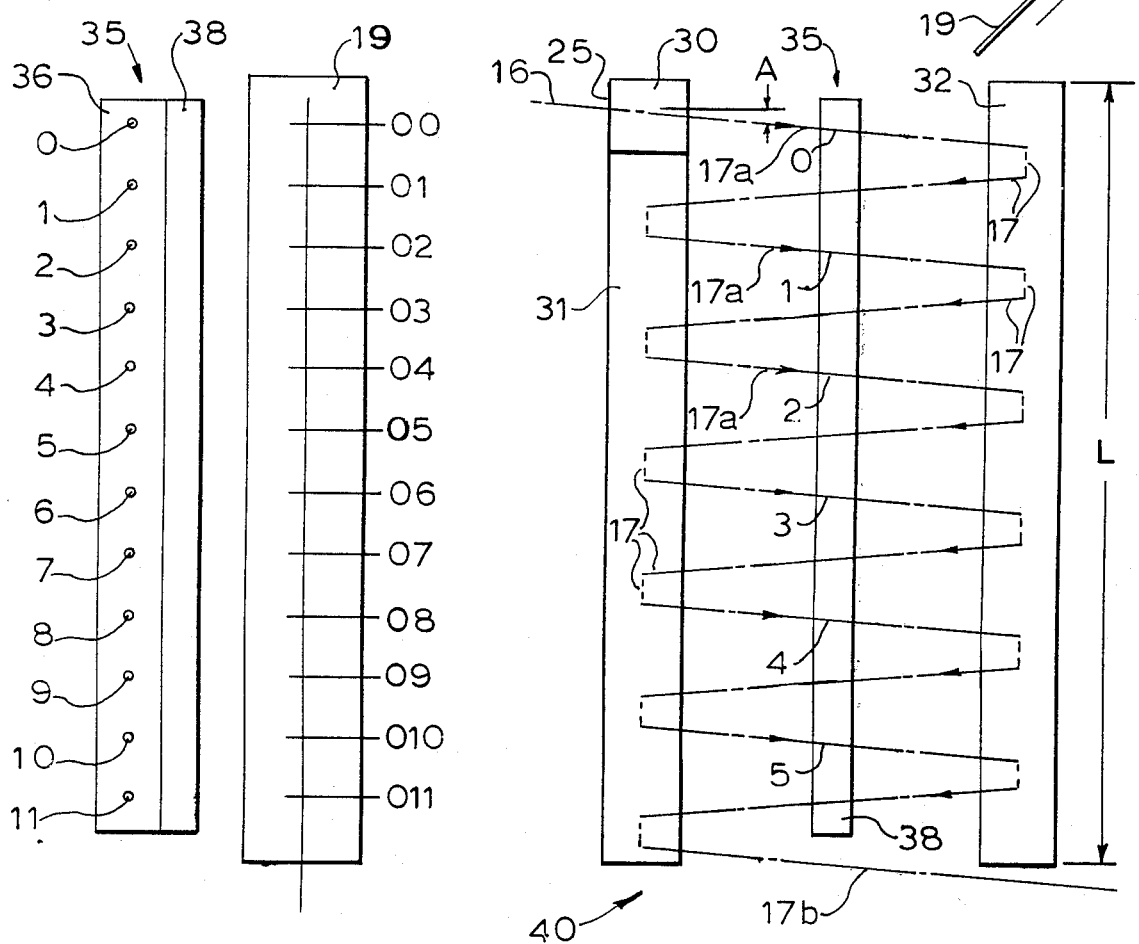
FIG. 3
FIG. 2

LIGHT OPTIC DATA HANDLING SYSTEMS

SUMMARY OF THE INVENTION

Information bearing light beams are directed along a light beam input path toward a light admitting surface of the data handling system of this invention. Upon entering the system a beam of light is then directed along a path therein which will be referred to as a primary optical path within the system. In following the primary path a light beam undergoes a series of light reflections which allows the beam to spiral its way through a length dimension of the system for the purpose of making available light thereof along any of a number of light output paths stemming from the system along its length dimension. By means of controllable OFF or ON conditioned light deflection control means coincident with output positions from which said output paths stem light available thereat may be directed along such secondary paths beyond the limits of the system for a recording of light beam information, or for still other forms of communications, data control purposes, etc. It is, however, an object of the invention to extend the resolution and deflection capabilities beyond that of present day acousto-optic, electro-optic, or other light beam positioning means.

The invention is illustrated, by way of example only, in the accompanying drawings and the description which follows when read in connection with the drawings will provide a better understanding of the objectives and other advantages of the invention.

BRIEF DESCRIPTION OF THE DRAWINGS

FIGS. 1 and 2 are first and second diagrammatic presentations of a system embodiment of the invention;

FIG. 3 is a showing of a portion of the system embodiment of the initial Figures for a more detailed understanding thereof;

DESCRIPTION OF THE INVENTION

Figure 4:
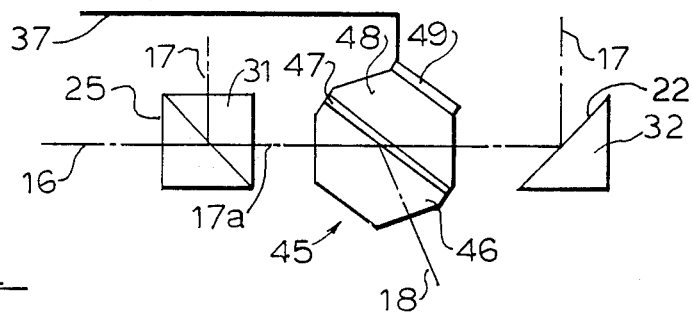
FIGS. 4, 5 and 6 are diagrammatic presentations, respectively, of various other individual light beam deflection control means that may be utilized in system embodiments of the invention.

Referring now to FIGS. 1 and 2, the light beam distributor 40 of the invention is shown to include, for example, an array of light reflecting prisms 31, 32, 33 and 34, each having a length dimension L. Closely adjacent to the prism 31 surface 21, and at but one end thereof, there is a prism 30 presenting an index of refraction lower than that of the prism 31. By means of block diagrams the system is shown to include control circuitry 14, a laser 12 as a light source means, a light beam modulator 15 positioned in the path of light from the laser 12, and additional circuitry 20 from which electrical signals are derived during the operation of the light beam deflection control means of the distributor 40.

Light from the source 12, which may be in the form of radiant energy extending from ultraviolet, through the visible spectrum, to infrared, is directed through the modulator 15 and thereupon along an initial path 16 toward a light admitting surface 25 under the control of input signals coupled to terminal means 13 of the system control circuitry 14. Light entering the distributor 40 will be directed along, what will be referred to as, a primary optical path 17 by means of an array of light reflecting surfaces 21, 22, 23 and 24, respectively, of prisms 31, 32, 33 and 34. Upon passage of a light beam through the interface 21 of the prisms 30 and 31 it will be reflected first by the surface 22 and thereupon by the surfaces 23, 24, 21, then again by the surfaces 22, 23, and so on. Because of an angle of entry A the light will follow a series of 360° primary optical paths, each displaced one with respect to the other in the direction of the length dimension L, until the light finds passage through the opposite end of the distributor 40. The angle A, and all other dimensions used in the illustrations, have been selected so as to simplify descriptions of the invention.

The primary optical path 17, which is being considered as spiralling, or winding, its way through the length dimension of the distributor 40 by means of the array of light reflecting surfaces, includes the sections 17a thereof which are shown as following the left to right course across the drawing in FIGS. 1 and 2. Light beam deflection means 35 is shown positioned in the way of light beams that may be directed along this section 17a of the optical path 17. However, that part of the deflection system 35 positioned in the way of light is of a light conducting means, which will be referred to as the medium 36, through which light will be allowed to pass along the paths 17a. FIGS. 2 and 3 indicates that the medium 36 is extended along the length dimension L of the distributor 40. In this embodiment the deflection system 35 is preferably an acousto-optical type having transducer means associated therewith for propagating acoustic waves therefrom in the direction of the arrow through the medium 36, in response to the application of electrical energy thereto. The medium 36 may be an elastic bar of light conducting material, for example, or a transparent container filled with water. The vibrating face of the transducer being in contact with the water, or, adjoined to the bar material. The transducer 38 may, for example, be in the form of a quartz crystal or other piezoelectric mechanical transducer means. Alternatively, the medium 36 may be a piezoelectric effect material, such as lithium niobate, or lithium tantalate, having any one of a number of well known interdigital electrode array, or single phase electrode array, transducer means intimately joined to a surface thereof for producing light diffracting acoustical surface waves therein in response to appropriate electrical signals connected thereto. The acoustic wave generating means, represented by the block diagram 38, is connected to the system control circuitry 14 through a controllable source of electrical power for driving the generating means 38.

In FIG. 3, a series of reference points 0 through 11 indicates points along the surface of the medium 36 at which light beams will pass therethrough when being directed along the corresponding series of optical paths 17a, without interruption along any of these paths. However, when a controlled interruption takes place at a given one of these reference points light will be directed away from the distributor 40 along a secondary path 18, and thereby corresponding to an ON conditioning of the light beam deflection control means, but only at said given one of the reference point positions. The effecting of a controlled interruption of the light along a given path 17a will be determined by a delay in time between the time light from the source 12 emanates from the modulator 15 and the time a diffracting of light takes place in the medium 36 in response to the application of electrical energy to the transducer means 38 from the circuitry 20. This delay in time is primarily under the control of electrical pulse generating means of the control circuitry 14 which are in turn responsive to input signals applied to terminal means 13.

Assuming that the distance a light beam travels from the time it leaves the prism surface 21 and thereupon returns, after being reflected at surfaces 22, 23 and 24, is equal to 0.3 meter, a continuing of the beam along the primary path 17 will allow it to arrive at each of the series of reference points 0 through 11 one nanosecond apart. Therefore, from the time a beam of light first reaches the reference point 0 and thereupon travels through the distributor 40 until it reaches the reference point 11 it will have taken the time of 11 nanoseconds and traveled a distance of 3.3 meters. If light through the modulator 15 is allowed to enter the distributor in the absence of a signal to direct light along a secondary path 18, and thereby allow the light to leave the distributor 40 along path 17b, for example, at the opposite end thereof, this would be considered an OFF condition for the system. But the presence of a signal to direct light along a secondary path 18 would be considered an ON condition of the system. And a particular time delay between the emanating of light from the modulator 15 and the time of diffracting said light in the medium 36 will determine from which reference point 0 through 11 light will be directed along a path 18 toward the record medium 19. Under a controlled ON condition light from the 0 reference point position will be directed to a 00 reference point on the record medium; light from the 1 reference point position will be directed to a 01 reference point on the record medium; etc.

The amount of time between the initiating of a signal to establish a light beam along the input path 16 and the actual establishing thereof can be, for example, 50 nanoseconds, but in any event a constant, and the amount of time between the initiating of a signal to modify the light conducting medium 36 and the actual directing of light along the output path 18 can be, for example, fifty nanoseconds, but in any event a constant. Therefore, the controlling of the medium 36 modifying time delay relative to the establishing of light along the path 16 will determine the number of consecutive reference points 0 through 11 along the medium 36 from which light will continue along the path 17 and the one point from which light will be directed along the output path 18 toward the record medium 19. Such directing of light along an output path 18 is to be considered as a distributor ON condition, and such condition will persist only as long as both the modified medium 36 and the modulator 15 passing of light persists. The period of time an ON condition is maintained will determine the record medium 19 exposure time to a given light output signal. Although the use of a record medium is exemplified the use of light output from the distributor is not to be limited in this regard. Although the use of but 0 to 11 output positions of the medium 36 have been discussed the invention is not to be limited in this regard. And equally important, the length dimension L requirements will vary with different application requirements. The usefulness of the invention may of course be increased through the use of additional optical means between the modulator 15 and the input surface 25, such as additional beam scanning or beam positioning means, beam focussing means, beam collimating means, beam expander means, etc.

Figure 5:
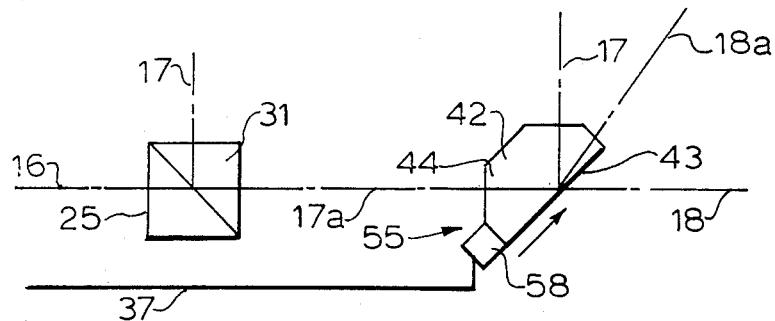

Additional understandings regarding the usefulness of the invention will become apparent from the following descriptions of further embodiments of the invention. Referring now to FIG. 4, a light beam reflection control means 45 is illustrated as being utilized in the distributor 40 of the invention instead of the deflection system 35 of FIG. 1. Control means 45 includes first, second and third light conducting materials, 46, 47 and 48, through which light along paths 17a will pass toward the surface 22, each material presenting a predetermined index of refraction, one with respect to the other, which is commensurate for said passing of the light beam. Materials 46 and 48 may be a glass material and the material 47 can be a thin layer of quartz, lithium niobate, lithium tantalate or related crystaline materials, sandwiched between the light conductors 46 and 48. Mechanical piezoelectric transducer means 49 is adjoined to material 48 having electrode means to which electrical signals will be connected through the conductor means 37. Upon the application of a pulse of electrical energy to the transducer means 49 a mechanical shockwave will be extended through the material 48 to the layer 47 effecting a momentary lowering of the index of refraction of the material 47 so as to reflect and, thereby, redirect light incident upon the interface of materials 46 and 47 along the output path 18. In accordance with the description of the initial embodiment, the controlling of the time delay between the emanating of light from the modulator 15 and the effecting of an index change in material 47 will determine the point, 0 through 11, from which light will be directed along the path 18. In FIG. 5, instead of utilizing reflection control means along the paths 17a the prism 32 as shown in FIGS. 1 and 2 has been replaced with an accousto-optic light reflection control device 55, which includes a prism of light conducting material 42 and a piezoelectric mechanical transducer 58 adjoining said prism along the length dimension L thereof. Upon the extending of the influence of a voltage to the transducer 58 along leads 37 from circuitry 20 it is designed to establish periodic strains in the direction of the arrow at the light reflecting surface 43 of the prism 42 so as to effect a light diffraction grating therein which extends the length dimension L of the surface 43. A controlling of the time delay between the emanating of light from the modulator 15 and the effecting of the diffraction grating will establish the point along the length L of the surface 43 from which light will be redirected along an output path and beyond the limits of the distributor. Depending on the operating characteristics of the device 55 light can be directed at a predetermined angle along a path through the surface 43, such as a path 18, or deflected therefrom along a path 18a. A designing of the device 55 can include the attaching of the transducer 58 to the end surface 44 of the prism 42 and thereby allow the periodic strains to propagate through the prism extending from the end 44 thereof and into the plane of the drawing toward the opposite end of the prism 42.

Figure 6:
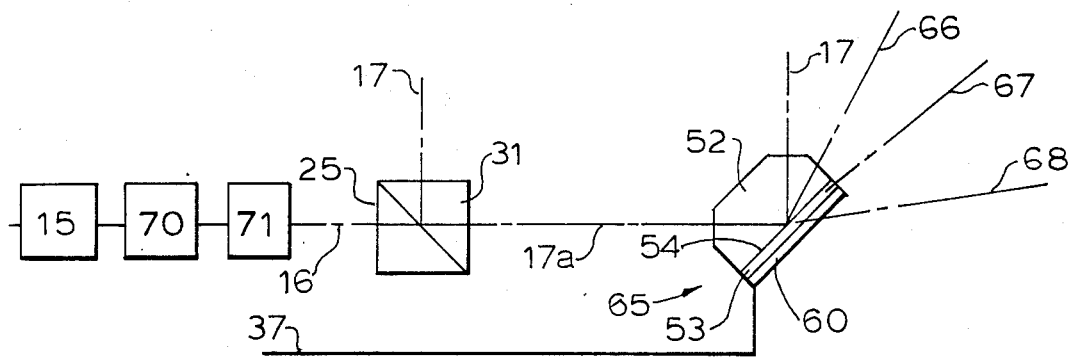
Figure 7:
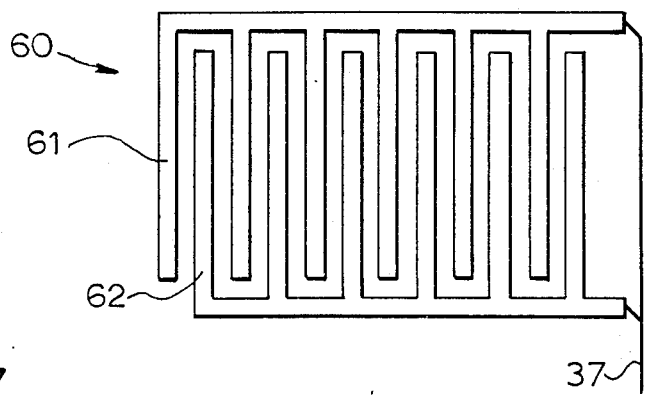
FIG. 7 is a diagrammatic presentation of an electrode assembly that may be utilized in the FIG. 6 control means.

In the FIG. 6 embodiment of the invention a light reflection control device 65 is utilized to replace the device 55 of FIG. 5. Herein a light conducting member 52 and a relatively thin layer 53 of piezoelectric material, lithium niobate, lithium tantalate, or any of a number of similar materials, are intimately joined so as to present a light reflecting interface 54 thereof; the layer 53 presenting an appropriately lower index of refraction thereat than the member 52 material. Light being directed along the paths 17a will therefore be reflected at the interface and along paths 17 as hereinbefore described. An interdigital electrode structure 60, of the type illustrated in FIG. 7, having fingers 61 and 62, and electrical conductor means 37 for connecting a voltage thereto, is joined to the layer 53. Upon the connecting of a voltage between the fingers periodic strains are established in the material 53 and extending to the interface 54, followed by periodic variations of index of refraction in the material 53 to the extent of causing a beam of light from along a path 17a and incident upon the interface 54 to be directed along an output path beyond the limits of the distributor. Materials and operating characteristics of the device can be chosen whereby a beam of light may be directed along a path 66, or a path 67, or a path 68. A controlling of the time delay between the emanating of light from the modulator 15, and thereupon along the input path 16, and the effecting of periodic strains at the interface 54 will establish the point along the length L of the interface 54 from which the light will be directed along an output path.

Referring again to FIG. 6, the member 52 of the control device 65 can be made of any of a number of clear light conducting materials exhibiting piezoelectric effects, such as quartz, tourmaline, lithium niobate, lithium tantalate, or like materials. Intermediate the electrode assembly 60 and the surface 54, and intimately joined therewith, the layer 53 can be a thin film of light conducting material, such as glass, having an index of refraction lower than that of the member 52. Upon the application of a voltage between the fingers 61 and 62, fringing electric fields established between the fingers produce a corresponding periodic strain in, and at the interface of, the member 52 and the film 53. This compressional strain at the interface of the materials 52 and 53 produces a spatially periodic variation of index of refraction of materials thereat, thereby providing a diffraction grating which results in a redirecting of light along an output path therefrom. The thickness of the film 53 in either of these latter embodiments need not be much more than the wavelength of the light being utilized.

As stated hereinbefore, and diagrammatically illustrated in the FIG. 6 embodiment of the invention, light beam positioning means 70, such as the well known acousto-optic light deflectors, and a light beam collimating means 71, positioned along the input path 16 so as to effect a directing of light from the source 15 along a plurality of input paths, paralleling the path 16, toward the prism surface 25, may be used to provide line-scan input information or a combination of X and Y input beam information. Line-scan information may include, for example, the use of 100, 500, or 1,000 individual input paths paralleling the path 16 and along which information bearing beams may be directed. When so directed the number of such input paths being provided for will, for example, extend from a 0 reference point on the surface 25 in the direction of the length L of the distributor and thereupon establishing therein a corresponding number of primary optical paths spiralling their way through the distributor 40. The controlling of the time delay between the emanating of light from the collimating means 71 for each individual input path, and the effecting of a redirecting of light thereof along an output path, will establish the point along the length L of the reflection control means from which light will be redirected. Through the use of combinations of X and Y scan input beam information a much greater use of the invention will be possible, for example, in the generation of letters, numerals, symbols, etc. In view of the limitations of present day acousto-optic, or electro-optic, beam positioning devices, when used in combination with the distributor means herein their resolution and deflection capabilities can be increased two, five, ten, or more times.

Electronic circuitry and functions called for in the foregoing references to the block diagrams 14, 15 and 20, for example, are well known in the art and set forth in numerous logic handbooks and computing devices texts.

In each of the embodiments the discussion thereof has been limited to the use of but four light reflecting surfaces 21, 22, 23 and 24. However, the invention is not to be limited in this regard. Five or more such reflecting surfaces can be used for each 360° spiral of a primary optical path. In doing so a wider choice of the angle of incidence of light will be possible, particularly in regard to the use of the light beam deflection control means being considered herein.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:
1. A light optic data handling system comprising:
   a. a source of light;
   b. a light admitting surface;
   c. a source of control voltages;
   d. ON or OFF light availability control means and means for establishing an ON condition thereof for allowing the passage of light from said source of light along at least one input path toward said admitting surface in response to an extending of the influence of an electrical potential thereto from said source of voltages, and means for thereupon directing said light along a series of 360° primary optical paths within said system so as to establish an availability of light from any one of a plurality of output locations of said system;
   e. said system presenting a length dimension and having an array of light reflecting surfaces therein extended along said length dimension for providing said series of optical paths, each said surface angularly oriented so as to establish an optical relationship one with respect to the other and with respect to the light along said input path, said series of optical paths displaced one with respect to the other in a side-by-side relationship in the direction of said length dimension, said plurality of output locations extended along said length dimension and each positioned in a light reflection control relationship to a corresponding one of said primary optical paths;
   f. ON or OFF light directional control means and means for establishing an ON condition thereof for allowing light along a primary optical path to follow a path leading away from an output location of said system in response to an extending of the influ- ence of an electrical potential thereto from said source of voltages;

g. signal input circuit means for effecting a predetermined time delay between said allowing of the passage of light along said input path in response to an ON condition of said light availability control means, and said allowing of light to follow a path leading away from an output location of said system in response to an ON condition of said directional control means, for controlling a redirecting of light from a predetermined one of said series of primary optical paths and thereupon along a path leading away from a corresponding output location of said system.

2. The invention as set forth in claim 1 wherein said light directional control means is positioned along the way of said array of primary optical paths intermediate two succeeding light reflecting surfaces of said array of surfaces.

3. The invention as set forth in claim 1 wherein said light directional control means is positioned within said system so as to coincide with at least one light reflecting surface of said array of surfaces.

* * * * *